United States Patent
Cnudde et al.

(10) Patent No.: US 8,302,192 B1
(45) Date of Patent: Oct. 30, 2012

(54) INTEGRATING ANTI-VIRUS IN A CLUSTERED STORAGE SYSTEM

(75) Inventors: Isabelle Cnudde, Sunnyvale, CA (US); Rommel Dongre, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1125 days.

(21) Appl. No.: 12/113,074

(22) Filed: Apr. 30, 2008

(51) Int. Cl.
   *H04L 29/06* (2006.01)
(52) U.S. Cl. .......... 726/24; 726/22; 726/23; 726/25
(58) Field of Classification Search ............ 726/22, 726/23, 24, 25
   See application file for complete search history.

(56) References Cited

U.S. PATENT DOCUMENTS

| | | | |
|---|---|---|---|
| 7,363,657 B2 * | 4/2008 | Caccavale | 726/24 |
| 7,743,417 B2 * | 6/2010 | Williams | 726/24 |
| 7,844,700 B2 * | 11/2010 | Marinescu et al. | 709/224 |
| 7,908,656 B1 * | 3/2011 | Mu | 726/22 |
| 2002/0103783 A1 * | 8/2002 | Muhlestein | 707/1 |
| 2007/0168693 A1 * | 7/2007 | Pittman | 714/4 |

* cited by examiner

*Primary Examiner* — Carl Colin
*Assistant Examiner* — Gary Lavelle
(74) *Attorney, Agent, or Firm* — Schwegman Lundberg & Woessner, P.A.

(57) ABSTRACT

A method and system for integrating anti-virus in a clustered storage system. A clustered storage system provides anti-virus scanning with third-party software components. Specifically, the clustered storage system receives a request to access data from a client, retrieves the data from storage, and scans the data for viruses with third party software components that have been previously provided any one of a number of third party software vendors. If the data is free of viruses, the clustered storage system communicates the data to the client. Otherwise, the clustered storage system attempts to apply remedial actions to the infected file. For example, the clustered storage system may attempt to repair the file by removing the virus. If remedial action successfully removes the virus, the clustered storage system communicates the requested data to the client. Otherwise, the clustered storage system communicates an access denied message to the client.

20 Claims, 12 Drawing Sheets

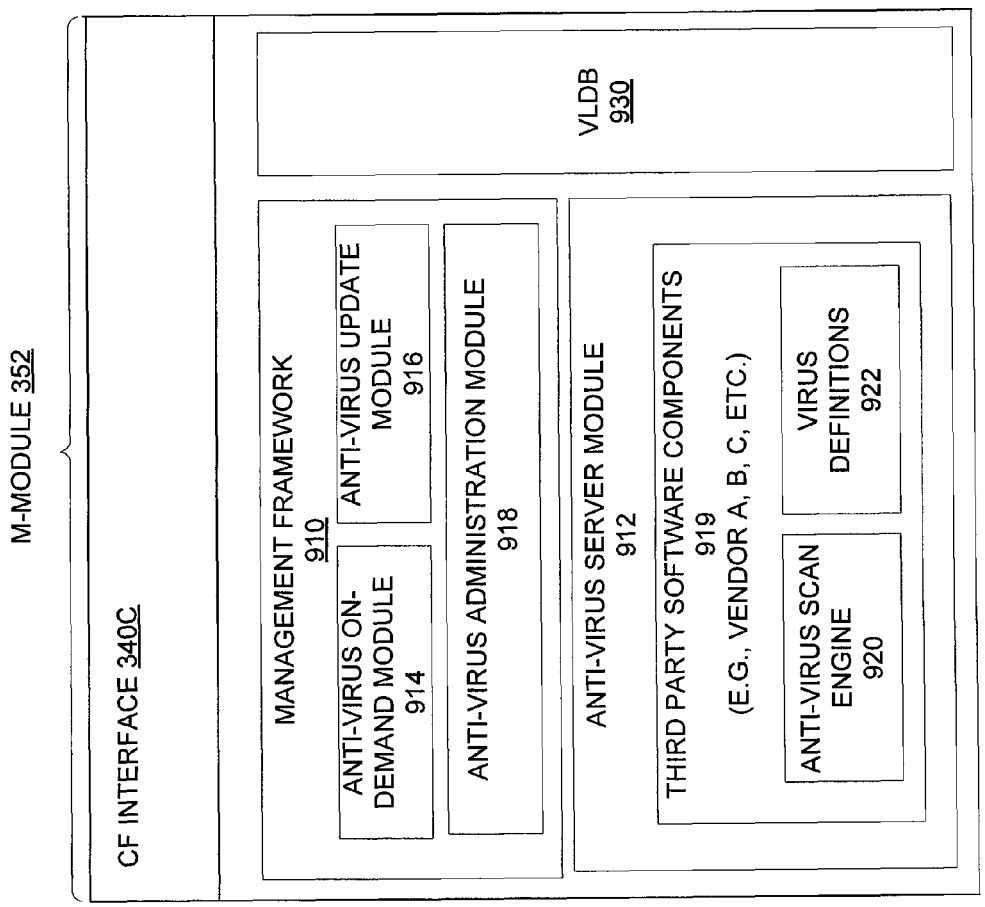

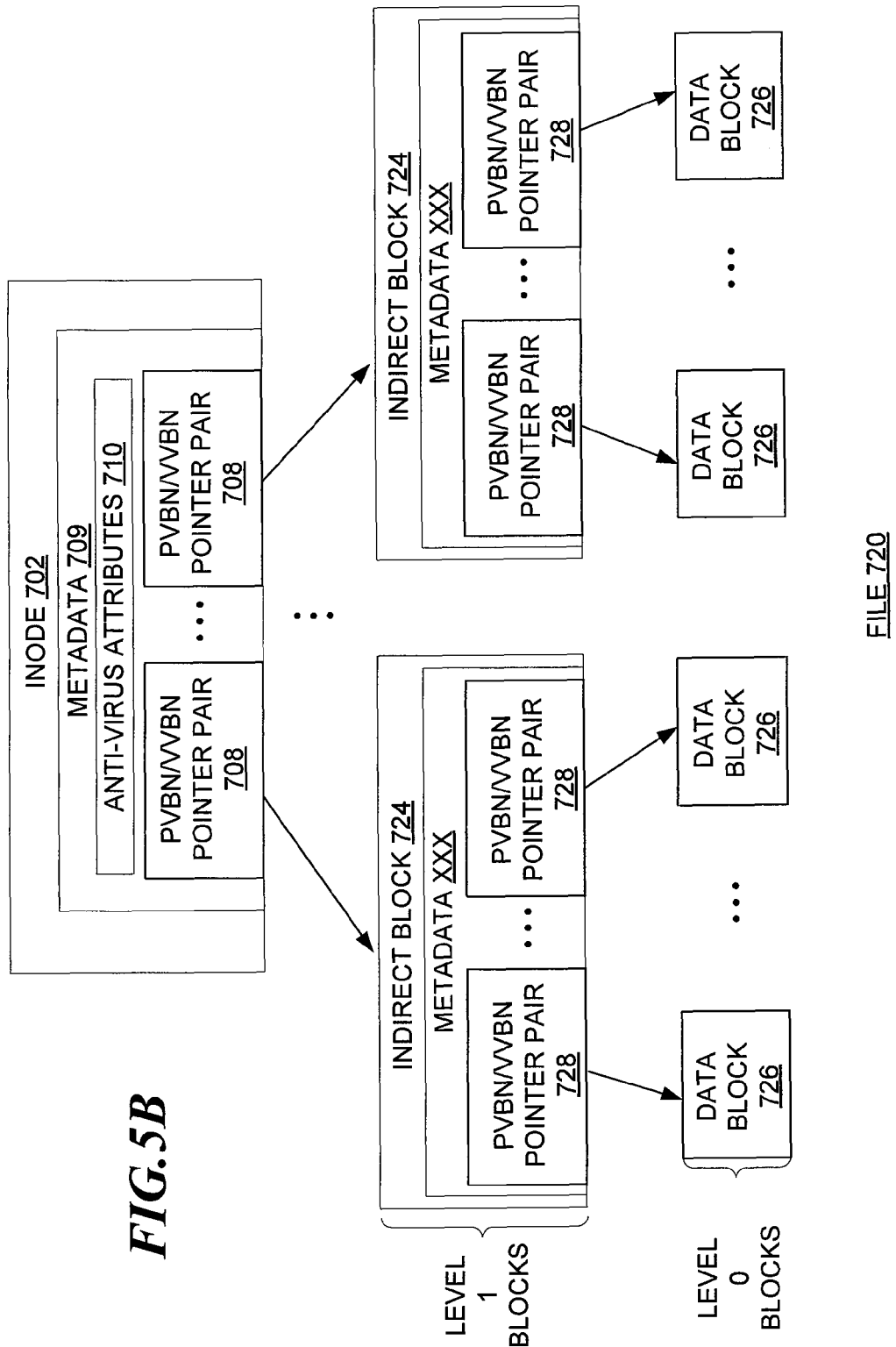

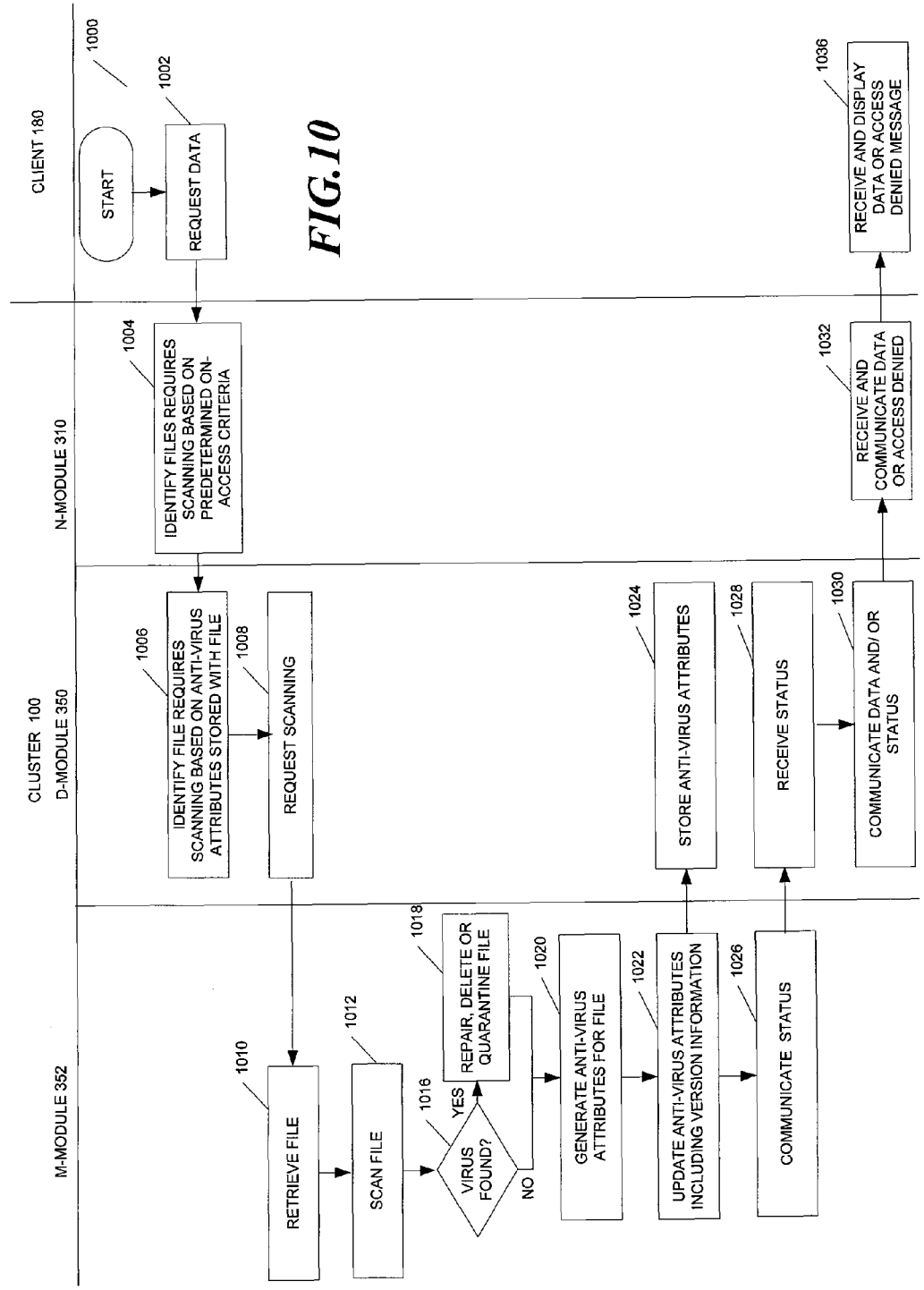

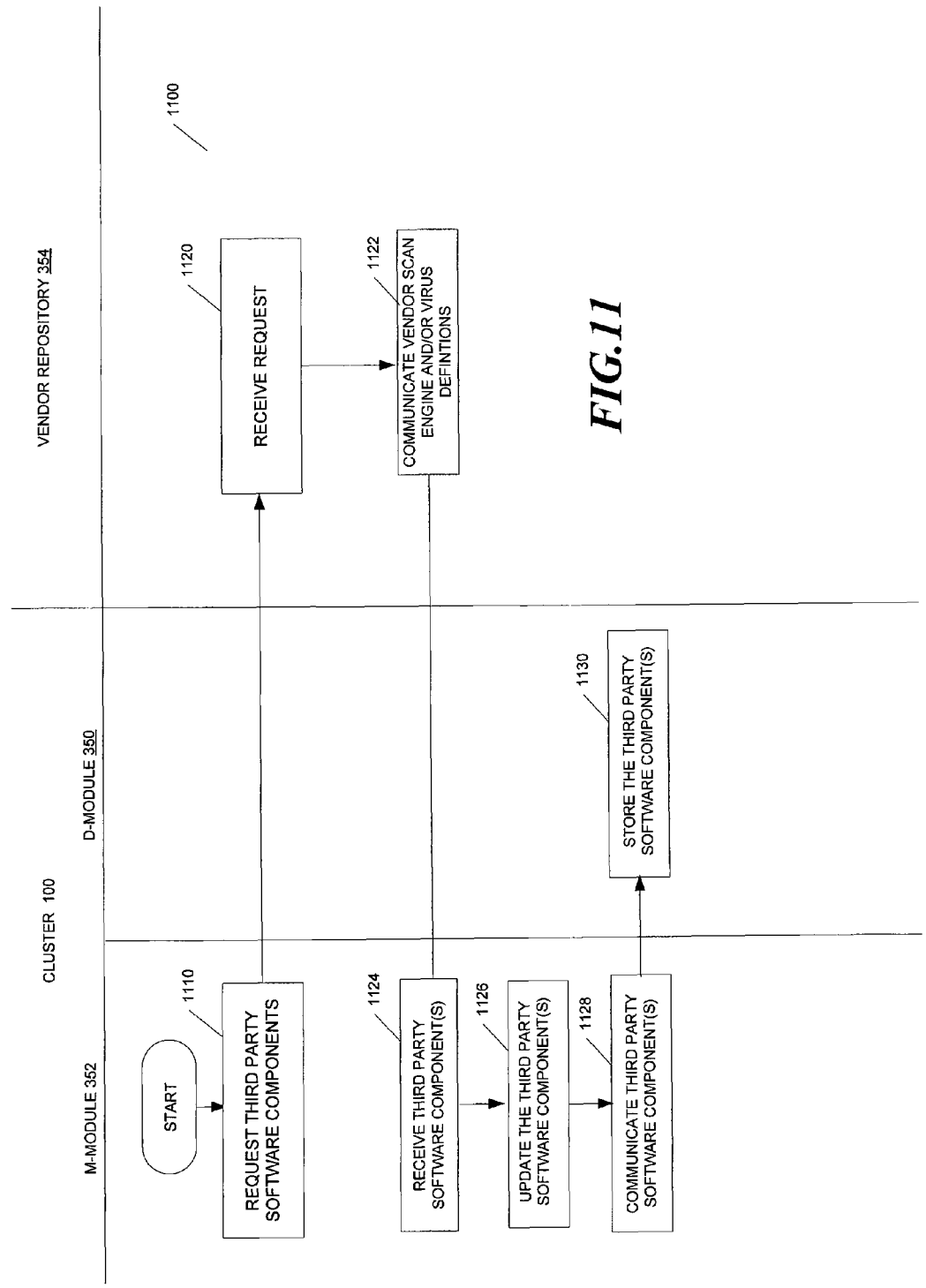

INTEGRATING ANTI-VIRUS IN A CLUSTERED STORAGE SYSTEM

BACKGROUND

1. Field

The present disclosure relates generally to storage systems and more specifically to integrating anti-virus in a clustered storage system.

2. Background

A clustered storage system typically provides data storage and retrieving services. For example, a client may request access to data that is stored on the clustered storage system and the clustered storage system may respond to the request by retrieving the data for the client. In addition, a clustered storage system may concurrently provide others services that may be desired by the client.

SUMMARY

An aspect of the present disclosure overcomes the disadvantages of the prior art by providing a technique whereby data is scanned for viruses on a clustered storage system with third party software components. Specifically, the clustered storage system scans the data for viruses with third party software components that are provided by a third party vendor. As a result, the producers of the cluster storage system are not required to continually develop software components to combat new viral threats but may rely on any one of a number of third party vendors that specialize in monitoring the emergence of new viral threats and developing such software components to effectively counter such threats.

In general, the word "virus" refers to a program or piece of code that is loaded onto a computer without the computer user's knowledge and runs against their wishes. Most viruses can also replicate themselves, and the more dangerous types of viruses are capable of transmitting themselves across networks and bypassing security systems. A "virus" can also include any malicious code, program, or other internal component (including but not limited to a computer virus, computer worm, computer time bomb, Trojan horse, or component with similar effect), that could damage, destroy, alter, or take control of, software, firmware, or hardware, or could, in any manner, reveal, damage, destroy, or alter any data or other information accessed through or processed by the computer in any manner. Accordingly, the above described "virus" represent an imminent danger to clients that utilize the data storage and retrieval services provided by a clustered storage system.

Merely for example, a clustered storage system may provide anti-virus scanning with third-party software components as follows. The clustered storage system receives a request for data from a client. The request may be to read data, write data or to perform another operation. Further the request may be for a file or a block of data. Next, the clustered storage system identifies whether the request for data includes data that should be scanned. For example, the clustered storage system may use a policy that is associated with the data or a persistently stored status to identify whether the data is scanned for viruses. If so determined, the clustered storage system scans the data for viruses with third party software components that have been previously provided any one of a number of third party software vendors. If the data is free of viruses, the clustered storage system communicates the data to the client. Otherwise the clustered storage system attempts to apply remedial actions to the infected file. For example, the clustered storage system may attempt to repair the file by removing the virus. If remedial action successfully removes the virus, the clustered storage system communicates the requested data to the client. Otherwise, the clustered storage system communicates an access denied message to the client.

The advantages of the present technique are realized in a reduction of cost and increased performance. The present technique reduces cost by providing a platform whereby third party software vendors may compete to provide the third party software components for the scanning of viruses. Specifically, the clustered storage system is free to acquire the third party components from any one of a number of third party software vendors thereby creating effective competition between third party software vendors. The present technique further increases the performance of the producers of the clustered storage system who may apply their engineering resources to subject matter which they have specialized knowledge, the storage and retrieval of data.

BRIEF DESCRIPTION OF THE DRAWINGS

The above and further advantages of the disclosure may be better understood by referring to the following description in conjunction with the accompanying drawings in which like reference numerals indicate identical or functionally similar elements:

FIGS. 3A-3B is a schematic block diagram of a storage operating system that may be advantageously used with the present disclosure;

FIG. 5B is a schematic block diagram of an illustrative embodiment of an inode tree of a file that may be advantageously used with the present disclosure;

FIG. 10 is a schematic block diagram illustrating a method for scanning data for viruses in accordance with an illustrative embodiment of the present disclosure; and FIG. 11 is a schematic block diagram illustrating a method for updating third party software components in accordance with an illustrative embodiment of the present disclosure.

DETAILED DESCRIPTION OF AN ILLUSTRATIVE EMBODIMENT

Figure 1:
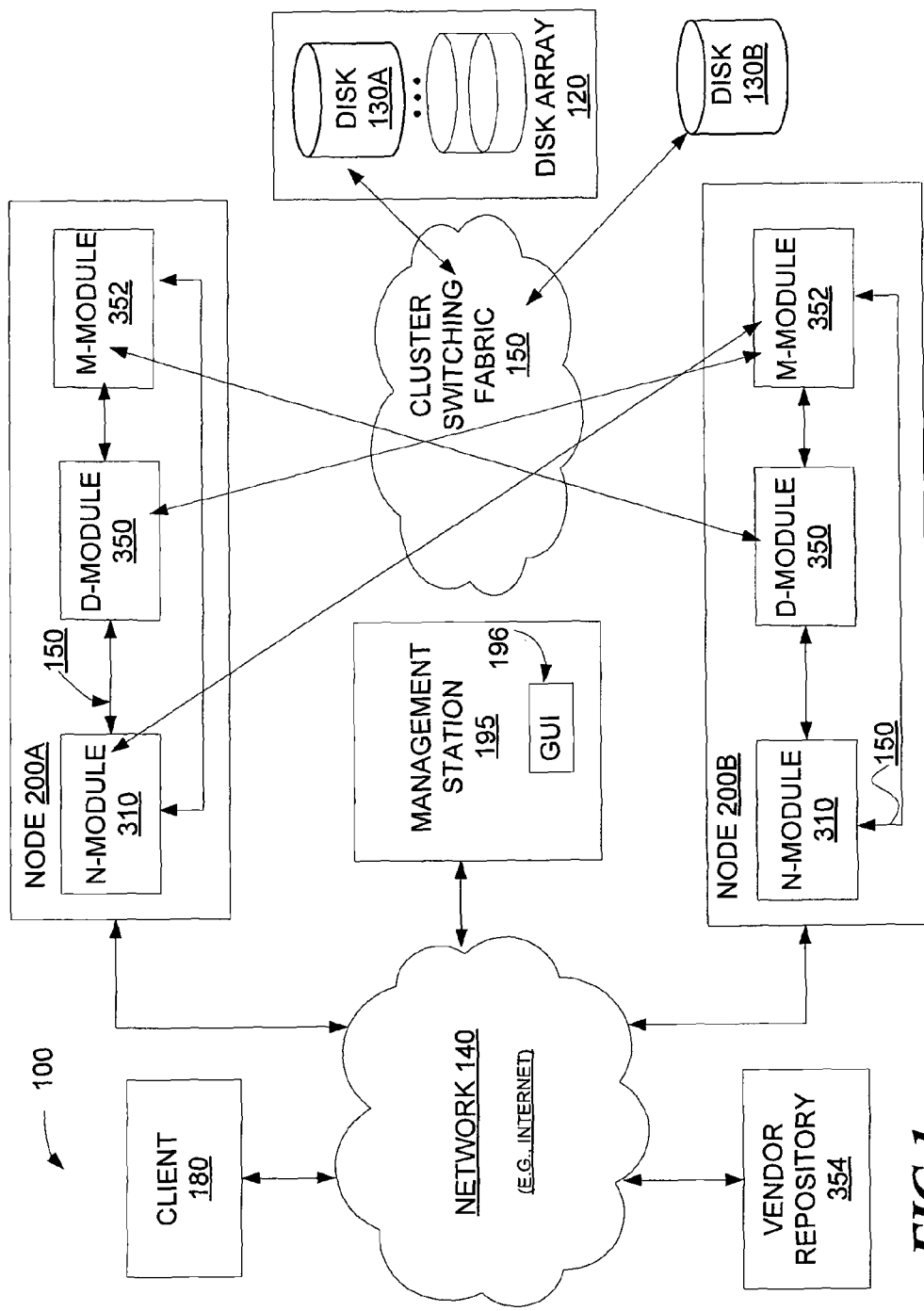
FIG. 1 is a schematic block diagram of a plurality of nodes interconnected as a cluster in accordance with an illustrative embodiment of present disclosure.

The present disclosure provides a technique for integrating anti-virus in a clustered storage system comprising nodes that communicate over a communication fabric to facilitate storage of data on the clustered storage system.

A storage system comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on the disks as a hierarchical structure of data containers, such as directories, files and blocks. For example, each "on-disk" file may be implemented as set of data structures, i.e., disk blocks, configured to store information, such as the actual data for the file.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout WAFL® file system available from NetApp, Inc., Sunnyvale, Calif.

The storage system may be configured to operate according to a client/server model of information delivery to thereby allow many clients to access data containers, such as directories, files and blocks stored on the system. In this model, the client may comprise an application, such as a database application, executing on a computer that "connects" to the storage system over a computer network, such as a point-to-point link, shared local area network (LAN), wide area network (WAN) or virtual private network (VPN) implemented over a public network, such as the Internet. Each client may request the services of the file system by issuing file-based and block-based protocol messages (in the form of packets) to the storage system over the network. By supporting a plurality of file system protocols, such as the conventional Common Internet File System (CIFS) and the Network File System (NFS) protocols, the utility of the storage system is enhanced.

Further, a plurality of storage systems may be interconnected as a clustered storage system to provide a storage system environment configured to service many clients. Each storage system may be configured to service one or more volumes, wherein each volume stores one or more data containers that contains data that may be scanned for viruses.

A. Cluster Environment

FIG. 1 is a schematic block diagram of a plurality of nodes 200 interconnected as a cluster 100 and configured to provide storage service relating to the organization of information on storage devices. The nodes 200 comprise various functional components that cooperate to provide distributed storage system architecture of the cluster 100. To that end, each node 200 is generally organized as a network element (N-module 310), a disk element (D-module 350) and a management element (M-module 352). The N-module 310 includes functionality that enables the node 200 to connect over a computer network 140 (e.g., Internet) to clients 180, a vendor repository 354 that provides third party software components in the form of an anti-virus scan engine and virus definitions, and a management station 195. Each D-module 350 connects to one or more storage devices, such as disks 130 of a disk array 120. The M-Module 352 provides a management framework that provides management services including anti-virus management services. The nodes 200 are interconnected by a cluster switching fabric 150 which, in the illustrative embodiment, may be embodied as a Gigabit Ethernet switch. An example distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N, D and M-modules in the illustrative cluster 100, there may be differing numbers of N and/or D and/or M-modules in accordance with various embodiments of the present disclosure. For example, there may be a plurality of N-modules and/or D-modules and/or M-modules interconnected in a cluster configuration 100 that does not reflect a one-to-one correspondence between the N, D and M-modules. As such, the description of a node 200 comprising one N-module, one D-module, and one M-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The management station 195, sometimes referred to as an M-host, is operated and controlled by an administrator who may send instructions in a maintenance mode of the cluster whereby the administrator can assign disks, reassign disks, or otherwise modify the disk topology or other configuration of the cluster 100. Further, the administrator may configure an anti-virus configuration information or request third party software components from vendor repositories 354. The third party software components may include anti-virus scan engines and virus definitions provided by third party vendors, such as SYMANTEC™, a computer software company in Cupertino, Calif., MCAFEE®, an antivirus software and computer security company in Santa Clara, Calif., TREND™MICRO, a company in Tokyo, Japan that develops software to protect against computer viruses, malware, span and Web-based threats, SOPHOS, a public limited company based in Oxfordshire, England and Burlington Massachusetts, USA, considered a world leader in IT security and control, and COMPUTER ASSOCIATES, a company based in Islandia New York, providing information technology management software. The management station 195 illustratively contains a graphic user interface (GUI) 196 or command line interface (CLI, not shown) whereby the administrator can interact with the software on the management station 195 in order to maintain, configure, and control the cluster 100. For example, the administrator can issue a command that requests the cluster 100 to scan a set of files for viruses.

B. Storage System Node

Figure 2:
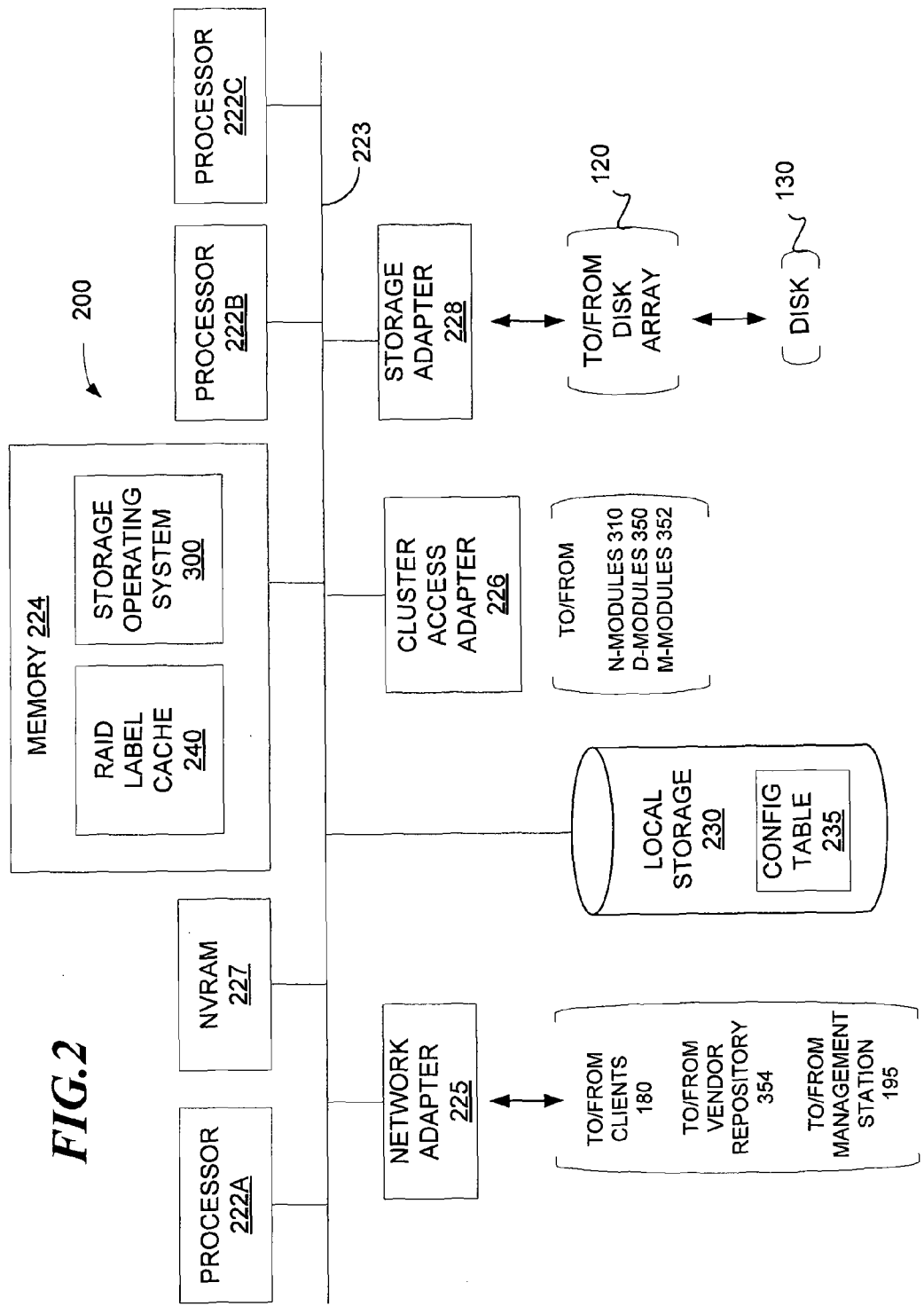
FIG. 2 is a schematic block diagram of a node in accordance with an embodiment of the present disclosure.

FIG. 2 is a schematic block diagram of a node 200 that is illustratively embodied as a storage system comprising a plurality of processors 222 *a,b,c*, a memory 224, a network adapter 225, an NVRAM 227 (non-volatile random access memory), a storage adapter 228, a cluster access adapter 226, and local storage 230 interconnected by a system bus 223. The local storage 230 comprises one or more storage devices, such as disks, which can be utilized by the node to locally store configuration information (e.g., in configuration table 235) provided by one or more management processes that execute as user mode applications 900 (see FIG. 9) and other information described herein. Alternatively, such information may be stored remotely. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments, where the N-modules, D-modules and M-modules are implemented on separate storage systems or computers, the cluster access adapter 226 is utilized by the N/D/M-modules for communicating with other N/D/M-modules in the cluster 100.

The NVRAM 227 is a non-volatile random access memory device that is used, inter alia, in a performance enhancement manner to avoid the latency which can be associated with writing data to disks. More specifically, as will be understood by those skilled in the art, a write request issued by a client is not acknowledged as having been received successfully until the write data has been persistently stored on the storage system. Illustratively, in the present cluster environment, the write data of a client-issued write request is first persistently stored in the NVRAM 227 of the node 200 having the D-module that currently owns the relevant disk. The write data is also written to a backup NVRAM of another D-module in the cluster prior to the write request being acknowledged to the client. Later, at a consistency point, the write data is written from the NVRAM on the "owner" D-module to the actual disk. However, in order to avoid latency associated with this procedure, the cluster may be configured such that an acknowledgement to the client that the write request has completed may be sent as soon as the data is first persistently stored to the NVRAM 227 of the owner D-module in the cluster. Later, the new write data stored in the NVRAM of the D-module is replayed and written persistently to its respective disk(s).

Each node 200 is illustratively embodied as a triple processor storage system executing a storage operating system 300 that implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single, two, or more than three processor system. Illustratively, one processor 222*a* executes the functions of the N-module 310 on the node, one processor 222*b* executes the functions of the D-module 350, and one processor 222*b* executes the functions of the M-module 350.

The memory 224 illustratively comprises storage locations that are addressable by the processors and adapters for storing software program code and data structures associated with the present disclosure. For example, a portion of the memory may be organized as a raid label cache 240 having locations used to store raid label data structures in accordance with the present disclosure. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers, such as directories and files, on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP™ operating system available from NetApp, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure.

Figure 3A:
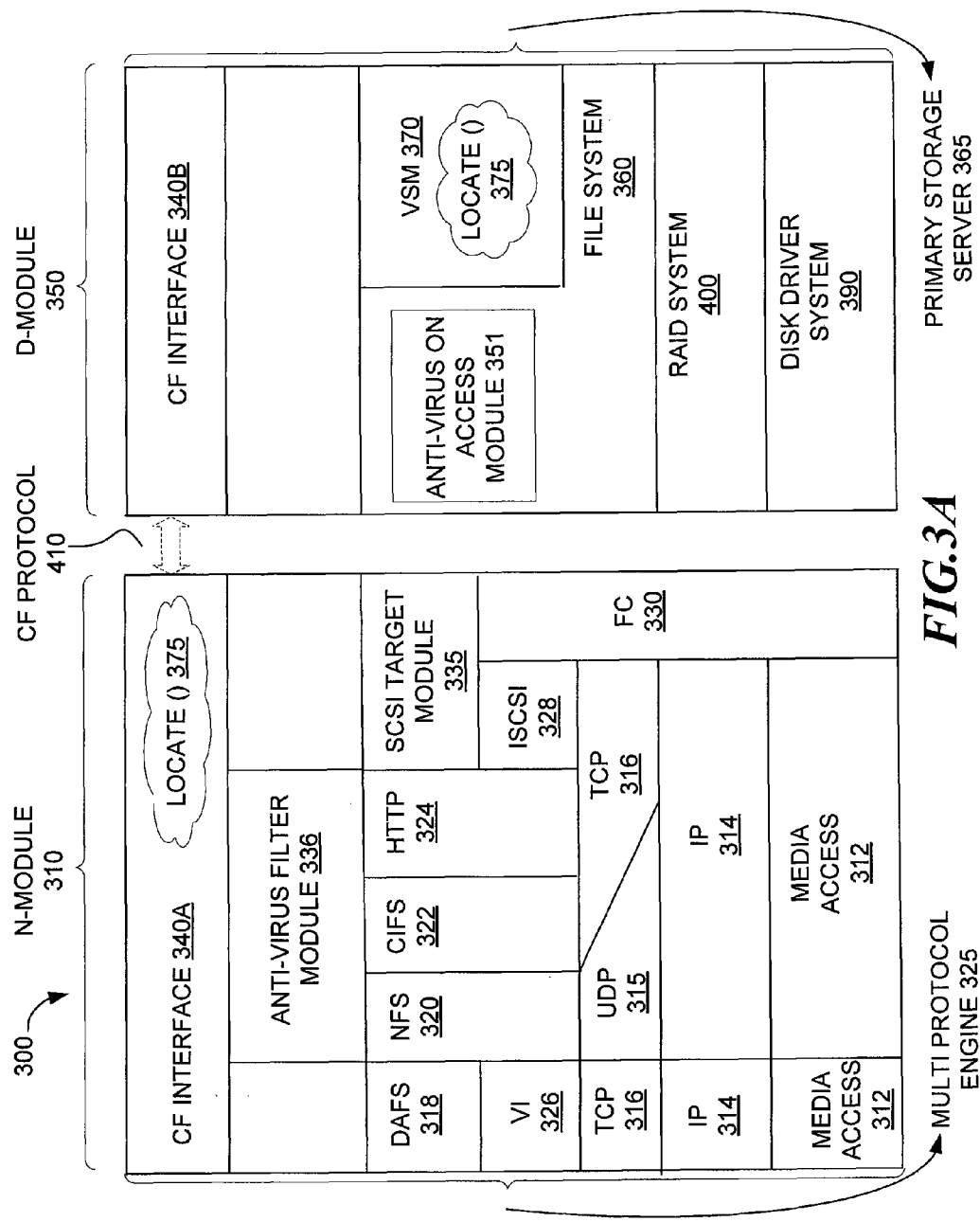

FIGS. 3A-3B is a schematic block diagram of the storage operating system 300 that may be advantageously used with the present disclosure. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200. An anti-virus filter module 336 may receive a request to access a file from a client 180 (e.g., read file, write file, create file, etc.), associate the request to on-access policy information that is identified based on the location of the requested data, as described later, and generate a scan flag and parameters based on the on-access policy information. Accordingly, the anti-virus filter module 336 may implement the on-access policy information to identify, via the scan flag and parameters, to the D and M modules 350, 352 whether the data associated with the request is to be scanned for viruses and, if so, to enable an optimization of scanning services. To this end, the anti-virus filter module 336 may communicate the generated scan flag and parameters along with the request to the D-Module 350.

In addition, the storage operating system includes a series of software layers organized to form a storage server 365 that provides data paths for accessing information stored on the disks 130 of the node 200. To that end, the storage server 365 includes a file system 360 in cooperating relation with a volume striping module (VSM) 370, a RAID system module 400 and a disk driver system module 390. The RAID system 400 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) of the present disclosure. As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 910 (see FIG. 9), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks. The file system 360 further includes an anti-virus on-access module 351 that may identify whether a file requires scanning based on anti-virus attributes stored with the requested file, as described later. To this end, the anti-virus on-access module 351, having identified scanning is required for a file, may communicate the request along with the previously generated parameters to the M-module 352.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

It should be noted that the software "path" through the storage operating system layers described above needed to perform data storage access for the client request received at the node may alternatively be implemented in hardware. That is, in an alternate embodiment of the disclosure, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the disclosure, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

D. RAID System

The present disclosure is implemented in the context of a configuration management framework used to implement the RAID system 400 in the storage operating system 300. In an embodiment, the configuration management framework provides an object-oriented approach to RAID configuration management, as described herein with respect to an implementation of the RAID system.

E. CF Protocol

Referring again to FIG. 3A, the storage server 365 is illustratively embodied as D-module 350 of the storage operating system 300 to service one or more volumes of array 120. In addition, the multi-protocol engine 325 is illustratively embodied as N-module 310 to (i) perform protocol termination with respect to a client issuing incoming data access request packets over the network 140, as well as (ii) redirect those data access requests to any storage server 365 of the cluster 100. Moreover, the N-module 310, D-module 350, and M-Module 352 cooperate to provide a highly-scalable, distributed storage system architecture of the cluster 100. To that end, each module includes a cluster fabric (CF) interface module 340a, b, c adapted to implement intra-cluster communication among the modules.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310, D-module 350 and M-module 352 are implemented as separately-scheduled processes of storage operating system 300; however, in an alternate embodiment, the modules may be implemented as pieces of code within a single operating system process. Communication between an N-module, D-module and M-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module or M-module) issues calls. To that end, the CF interface module 340 is organized as a CF encoder and CF decoder. For example, the CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

FIG. 3B is a schematic block diagram of the M-module 352 that may be advantageously used with the present disclosure. The M-module 352 is shown to include a collection of management processes that execute as user mode applications on the storage operating system 300 to provide management of configuration information (i.e. management data) for the nodes of the cluster. The management processes include, among other processes, a management framework process 910, an anti-virus server module 912, and a volume location database (VLDB) process 930.

The management framework 910 provides a user interface (GUI) to manage the cluster 100, as described further later. The management framework is shown to include an anti-virus on-demand module 914, an anti-virus update module 916, and an anti-virus administration module 918. The anti-virus administration module 918 may be used to provide an interface to the GUI where an administrator may enter anti-virus configuration information 716, enter a demand to scan one or more files for viruses, and request retrieval of third-party software components from a vendor repository.

The anti-virus administration module 918 may receive anti-virus configuration information 716 in the form of on-access policy information. The anti-virus administration module 918 may cause the on-access policy information to be stored on the local storage 230. The anti-virus filter module 336, on the N-module 310, in turn, may retrieve the on-access policy information in the form a predetermined criteria to identify whether a file requires scanning for viruses.

The anti-virus administration module 918 may further receive a demand to scan one or more files for viruses. The anti-virus administration module 918 may communicate the demand to the anti-virus on demand module 914 that, in turn, retrieves the requested file(s) via the file system 360 on the D-module 350, and requests the anti-virus server module 912 to scan the retrieved file(s) for viruses.

The anti-virus administration module 918 may further receive configuration information in the form of a request to retrieve third-party software components 919 from a remotely located vendor repository 354. The anti-virus administration module 918 may communicate the request to the anti-virus update module 916. The anti-virus update module 916, in turn, retrieves the requested third party software components 919 from the vendor repository 354, stores the third-party software component 919 on the local storage 230, communicates the third-party software component 919 to the anti-virus server module 912, and communicates the third-party software component 919 to the D-module 350 that, in turn, stores the third party software component 919 on a storage device (e.g., disk array 120).

The anti-virus server module 912 includes third party software components 919 that are used to scan files for viruses. Specifically, the third party software components 919 may include an anti-virus scan engine 920 and virus definitions 922 that have been provided over a network by any one of a plurality of vendor repositories 354 that are remotely located to the clustered storage system. As illustrated, the anti-virus server module 912 includes a single anti-virus scan engine 920 with virus definitions 922, however, other embodiments may include multiple anti-virus scan engines 920 each associated with virus definitions 922. The anti-virus server module 912 may receive a request to scan a file for viruses from the anti-virus on-access module 351 or the anti-virus on demand module 914. The anti-virus server module 912 may further receive a file from the D-module 350, read data from the file, and utilize the anti-virus scan engine 920 and the virus definitions 922 to scan the data for viruses. The anti-virus server module 912 may respond to the identification of an infected file by utilizing quarantine information to identify the appropriate response (e.g., repair, delete, quarantine), as described further later. The anti-virus server module 912 may further generate antivirus attributes based on the results of the scanning and cause the anti-virus attributes to be persistently stored with the file on a storage device (e.g., disk-array 120).

Figure 4:
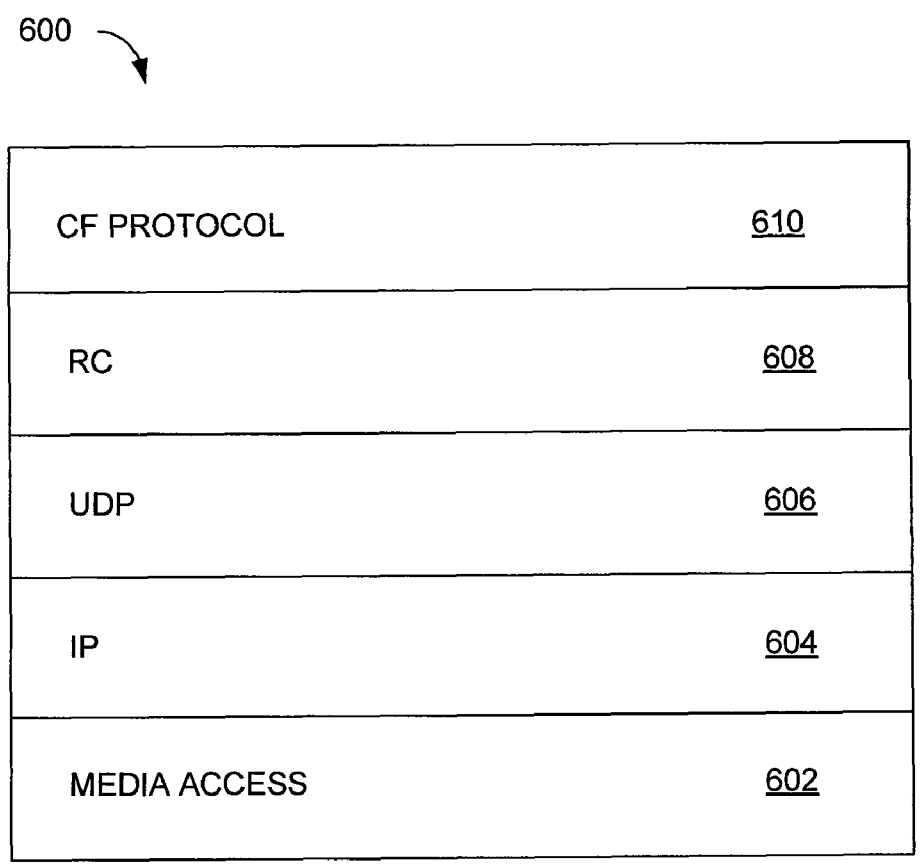
FIG. 4 is a schematic block diagram illustrating the format of a cluster fabric (CF) message in accordance with an illustrative embodiment of the present disclosure.

FIG. 4 is a schematic block diagram illustrating the format of a CF message 600 in accordance with an embodiment of with the present disclosure. The CF message 600 is illustratively used for RPC communication over the switching fabric 150 between remote modules of the cluster 100; however, it should be understood that the term "CF message" may be used generally to refer to LPC and RPC communication between modules of the cluster. The CF message 600 includes a media access layer 602, an IP layer 604, a UDP layer 606, a reliable connection (RC) layer 608 and a CF protocol layer 610. As noted, the CF protocol is a generic file system protocol that conveys file system commands related to operations contained within client requests to access data containers stored on the cluster 100; the CF protocol layer 610 is that portion of message 600 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 608 implements a reliable transport protocol that is adapted to process such envelopes in accordance with a connectionless protocol, such as UDP 606.

It will be appreciated that, in view of the described CF, the N-module 310 provides an abstraction layer by receiving a request in any one of a plurality of network protocols (e.g., NFS/CIFS) and communicating the request over the CF in a CF message 600 that is independent of the network protocols. Accordingly, the CF of the clustered storage system serves to decouple of anti-virus components that process network protocols from the anti-virus components which do not process network-protocols, the advantage being to isolate the mentioned components from each other and thereby facilitate relatively independent development of the respective components.

F. File System Organization

In the illustrative embodiment, a data container, such as a file, is accessed in the file system by a data container handle, and the data container is represented in the write-anywhere file system as an inode data structure adapted for storage on the disks 130. The in-core and on-disk format structures of the WAFL® file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 5A:
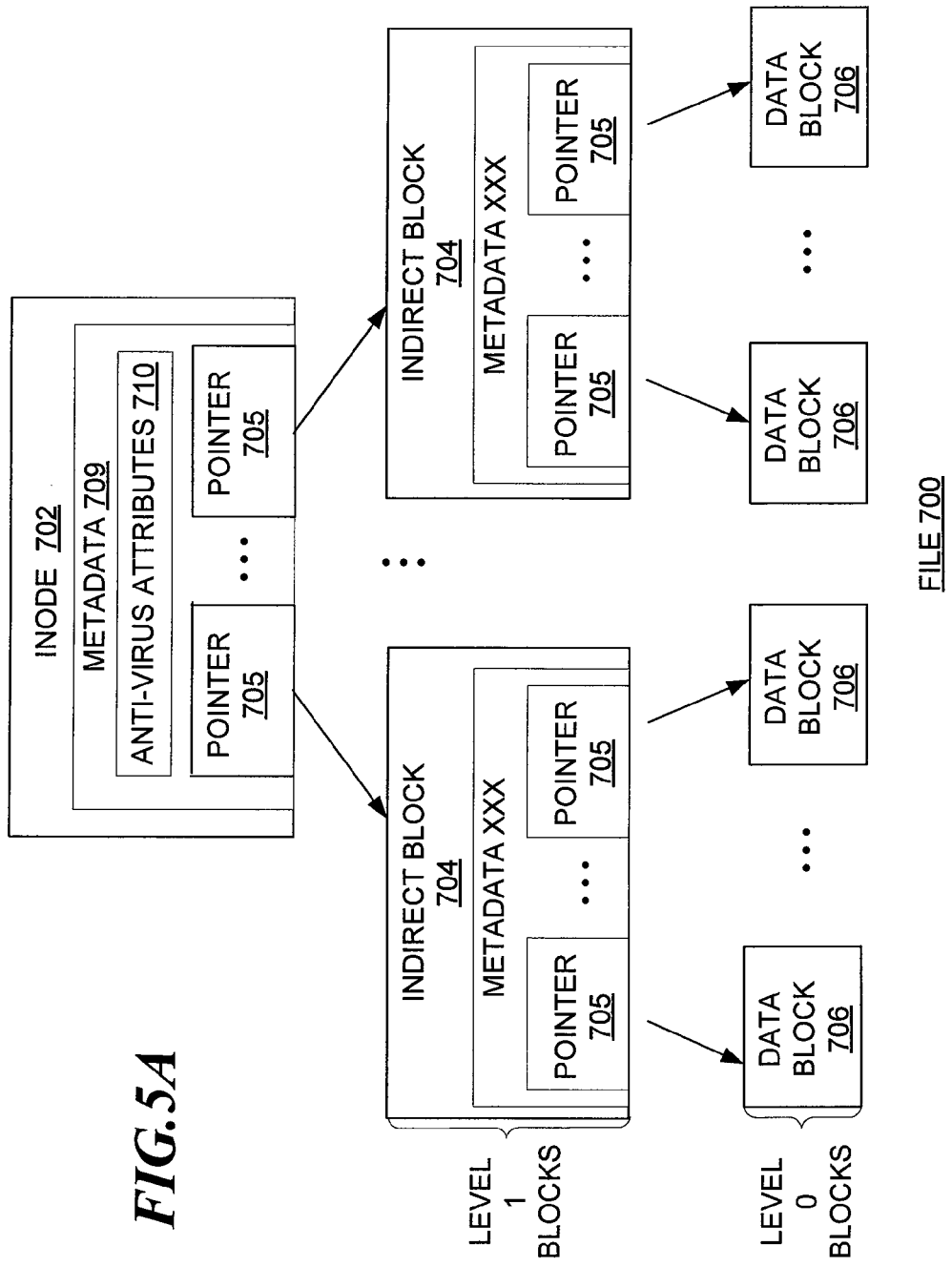
FIG. 5A is a schematic block diagram of an exemplary inode tree in accordance with an illustrative embodiment of the present disclosure.

FIG. 5A is a schematic block diagram of an embodiment of a buffer tree of a file that may be advantageously used with the present disclosure. The buffer tree is an internal representation of blocks for a file (e.g., file 700) loaded into the memory 224 and maintained by the write-anywhere file system 360. A root (top-level) inode 702, such as an embedded inode, includes metadata 709 that further includes anti-virus attributes 710 and references to indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to NetApp, Inc. The underlying physical volume is an aggregate comprising one or more groups of disks, such as RAID groups, of the node.

The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks. In one embodiment, one or more the above described physical volume may, along with a set of data interfaces, be referred to as a virtual server.

In one embodiment, pvbns are used as block pointers within buffer trees of files (such as file 700) stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, Mode file level 0 (L0) blocks.

FIG. 5B is a schematic block diagram of an illustrative embodiment of a buffer tree of a file 720 that may be advantageously used with the present disclosure. A root (top-level) inode 722, such as an embedded Mode that includes metadata 709 that includes anti-virus attributes 710 and references to indirect (e.g., level 1) blocks 724. Note that there may be additional levels of indirect blocks (e.g., level 2, level 3) depending upon the size of the file. The indirect blocks (and inode) contain pvbn/vvbn pointer pair structures 728 that ultimately reference data blocks 706 used to store the actual data of the file.

The pvbns reference locations on disks of the aggregate, whereas the vvbns reference locations within files of the flexible volume. The use of pvbns as block pointers 728 in the indirect blocks 724 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 6:
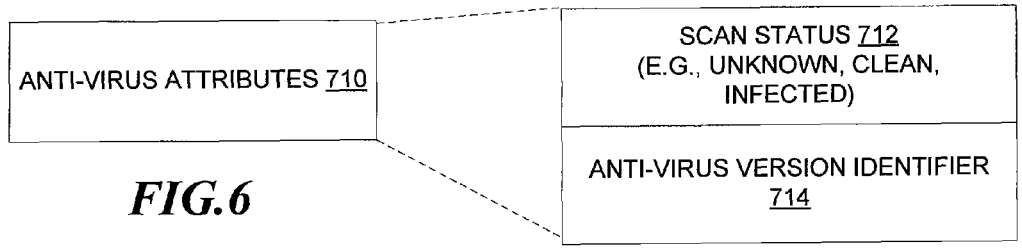
FIG. 6 is a schematic block diagram of an illustrative embodiment of antivirus attributes that may be advantageously used with the present disclosure.

FIG. 6 is a schematic block diagram of an illustrative embodiment of antivirus attributes 710 that may be advantageously used with the present disclosure. The antivirus attributes 710 are persistently stored in association with a buffer tree of a file and includes a scan status 712 and an anti-virus version identifier 714. The scan status 712 stores the results of the most recent anti-virus scan and may be "UNKNOWN," "CLEAN" or "INFECTED." The anti-virus version identifier 714 uniquely characterizes a combination of anti-virus scan engine 920 and virus definitions 922. The anti-virus attributes 710 may be advantageously used to identify whether the corresponding file requires scanning for viruses. For example, the anti-virus attributes 710 may identify a superseded version of third party software components 919. Specifically, the third party software components 919 that are being presently utilized in the anti-virus server module 912 may have been recently updated. In such instances, any file associated with a previous anti-virus version identifier 714 and a "CLEAN" status may require scanning with the recently updated third party software components 919 (e.g., anti-virus scan engine 920 and virus definitions 922).

Figure 7:
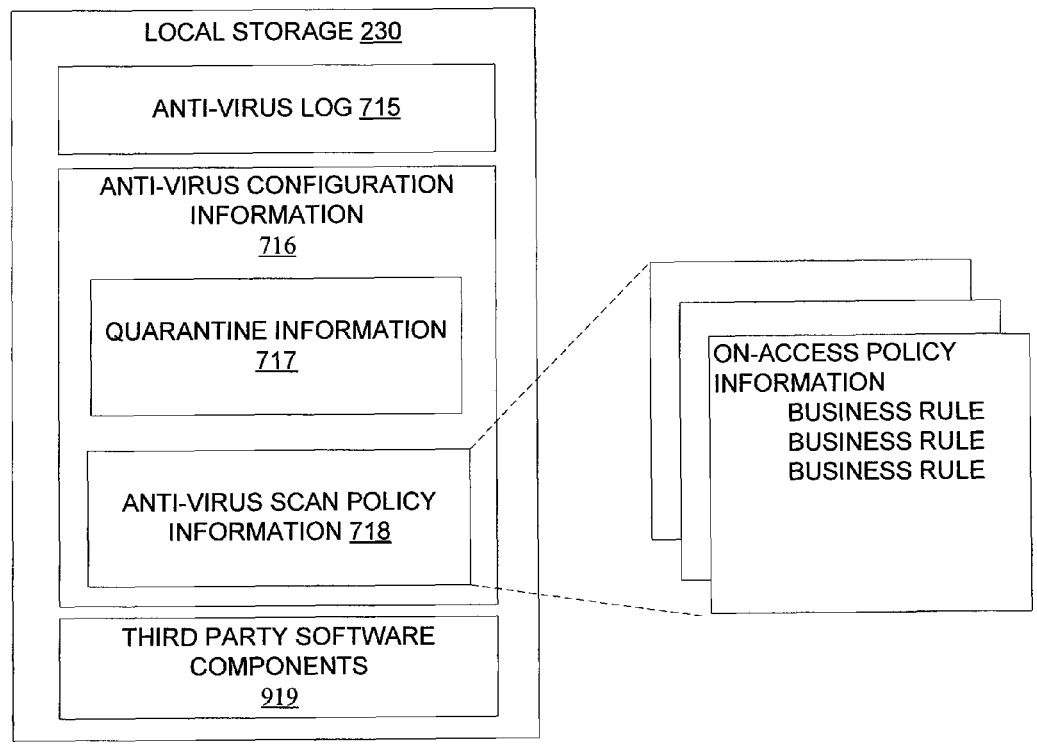
FIG. 7 is a schematic block diagram of an illustrative embodiment of local storage that may be advantageously used with the present disclosure.

FIG. 7 is a schematic block diagram of an illustrative embodiment of local storage 230 that may be advantageously used with the present disclosure. The local storage is shown to store an anti-virus log 715, anti-virus configuration information 716, and third party software components 919, previously described.

The anti-virus log 715 may be used to store time stamped events that chronicle activities performed by the anti-virus services. For example, an event may be logged that chronicles receipt of a request to access a file, receipt of a demand to access a file, or the update of third party software components 919. The anti-virus log 715 may be advantageously used to identify the operations performed by the anti-virus services for a particular file.

The anti-virus configuration information 716 stores information entered by an administrator that may be utilized to configure the operation of the anti-virus services on the clustered storage system. The anti-virus configuration information 716 includes quarantine information 717 and anti-virus scan policy information 718. The quarantine information 717 includes information and business rules to remediate a virus. For example, the quarantine information 717 may specify that a file infected with a virus may be repaired or not repaired. If the quarantine information 717 specifies a repair is appropriate, then the quarantine information 717 may further specify whether an attempt is made to remove the virus from the file, delete the file, or quarantine the file. If the quarantine information 717 specifies a quarantine is appropriate, then the quarantine information 717 may further specify the form of quarantine. For example, the form of quarantine may include moving the file to a specified folder or other location, renaming the file, or changing the sector that is used to store the file.

The anti-virus scan policy information 718 includes multiple on-access policy information entries that respectively contain on-access policies. Each on-access policy may be configured to be associated with one or more virtual servers. Further, the anti-virus filter module 336 may compare the one or more configured virtual servers in each on-access policy with a requested virtual server to identify the appropriate on-access policy. In other words, the anti-virus filter module 336 may receive a request for data, map the data to a requested virtual server, and identify the appropriate on-access policy based on the requested virtual server and the virtual server associated with the on-access policy.

Each on-access policy may further include one more business rules that may be applied to the request. The respective business rules may include predetermined criterion or criteria that may be applied to the request to identify whether the requested data is to be scanned for viruses. For example, an administrator may utilize the management station 195 to configure the criterion or criteria (e.g., predetermined criterion or criteria) in the form of business rules that may include, a file extension business rule, a shared mount point business rule, a permission level business rule, a protocol business rule, and a file operation profile business rule.

The file extension business rule may be executed to identify whether any one of enumerated file extensions (e.g., ".doc," ".pdf," etc.) in the business rule matches an extension appended to a file that contains the requested data. A match may trigger or block scanning of the file. Accordingly, the file extension business rule provides the advantage of providing administrator control over anti-virus scanning based on file type.

The shared mount point business rule may be executed to identify whether a request for data is associated with a file that is stored in a predetermined location such as a shared mount point. For example, the shared mount point may be a set of files or a file directory included within the virtual server associated with the on-access policy. Identification of the file being stored in such a predetermined location may trigger or block scanning of the file. Accordingly, the shared mount point business rule provides the advantage of providing administrator control over ant-virus scanning of a file based on a predetermined location such as a file directory that is used to store the file.

The permission level business rule may be executed to identify whether a request for data is associated with a file that is associated with a specified permission. Merely for example, the NFS file system protocol provides for file permission levels including "read," and/or "write," and/or "execute" permissions. Identification of a file associated with the "execute" permission level may trigger scanning. Accordingly, the permission level business rule provides the advantage of providing administrator control over anti-virus scanning of a file based on a permission level associated with the file.

The network protocol business rule may execute to identify whether a request for data is received in a specified network protocol. Merely for example, the request for data may be received in file based network protocols such as the NFS or CIFS or block based protocols such as SCSI, Fibre Channel, iSCSI, etc. Identification of the request for data being received in a network protocol that is also an identified network protocol may trigger or block scanning of the file. Anti-virus scanning services are not provided for block based protocols which are considered to be low risk with regard to viruses. Accordingly, the network protocol business rule provides the advantage of providing administrator control over anti-virus scanning of a file based on network protocol utilized to communicate the request for data to the clustered storage system.

The file operation business rule may be used to identify a file operation profile to process the request for data. For example, the file operation business rule may identify an optimal type of file operation profile (e.g., NFS, CFS, Hybrid) that may be used to process the request. To this end, the file operation profile includes a set of commands that are economized for the clients operational environment (e.g., NFS, CFS, Hybrid). Accordingly, the file operation business rule provides the advantage of identifying a file operation profile that includes an optimal set of commands to process the request for data.

Figure 8:
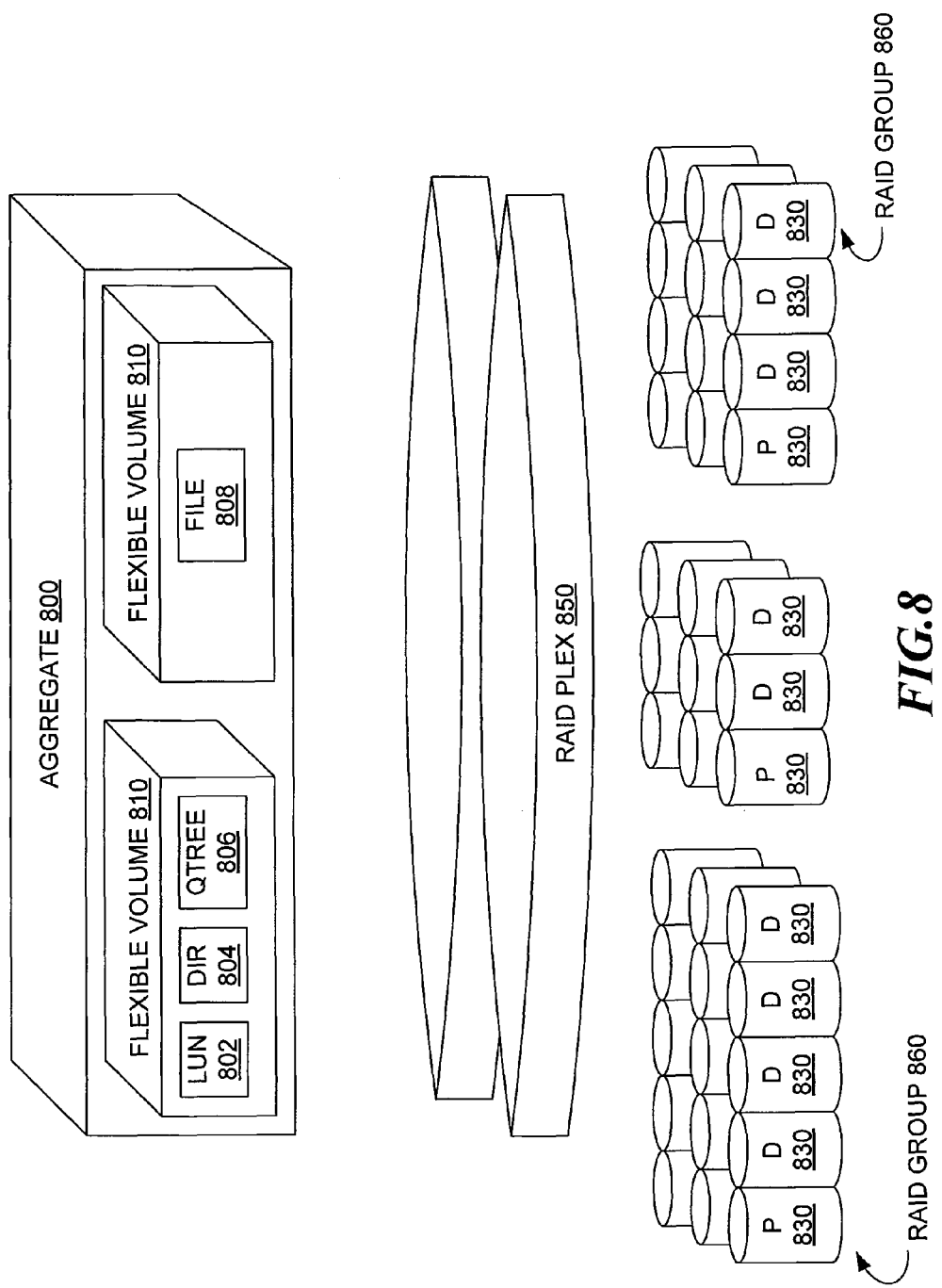
FIG. 8 is a schematic block diagram of an exemplary aggregate in accordance with an illustrative embodiment of the present disclosure.

FIG. 8 is a schematic block diagram of an embodiment of an aggregate 800 that may be advantageously used with the present disclosure. Luns (blocks) 802, directories 804, qtrees 806 and files 808 may be contained within flexible volumes 810, such as dual vbn flexible volumes, that, in turn, are contained within the aggregate 800. The aggregate 800 is illustratively layered on top of the RAID system, which is represented by at least one RAID plex 850 (depending upon whether the storage configuration is mirrored), wherein each plex 850 comprises at least one RAID group 860. Each RAID group further comprises a plurality of disks 830, e.g., one or more data (D) disks and at least one (P) parity disk.

Whereas the aggregate 800 is analogous to a physical volume of a conventional storage system, a flexible volume is analogous to a file within that physical volume. That is, the aggregate 800 may include one or more files, wherein each file contains a flexible volume 810 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 810 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 400; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

G. VLDB

Figure 9:
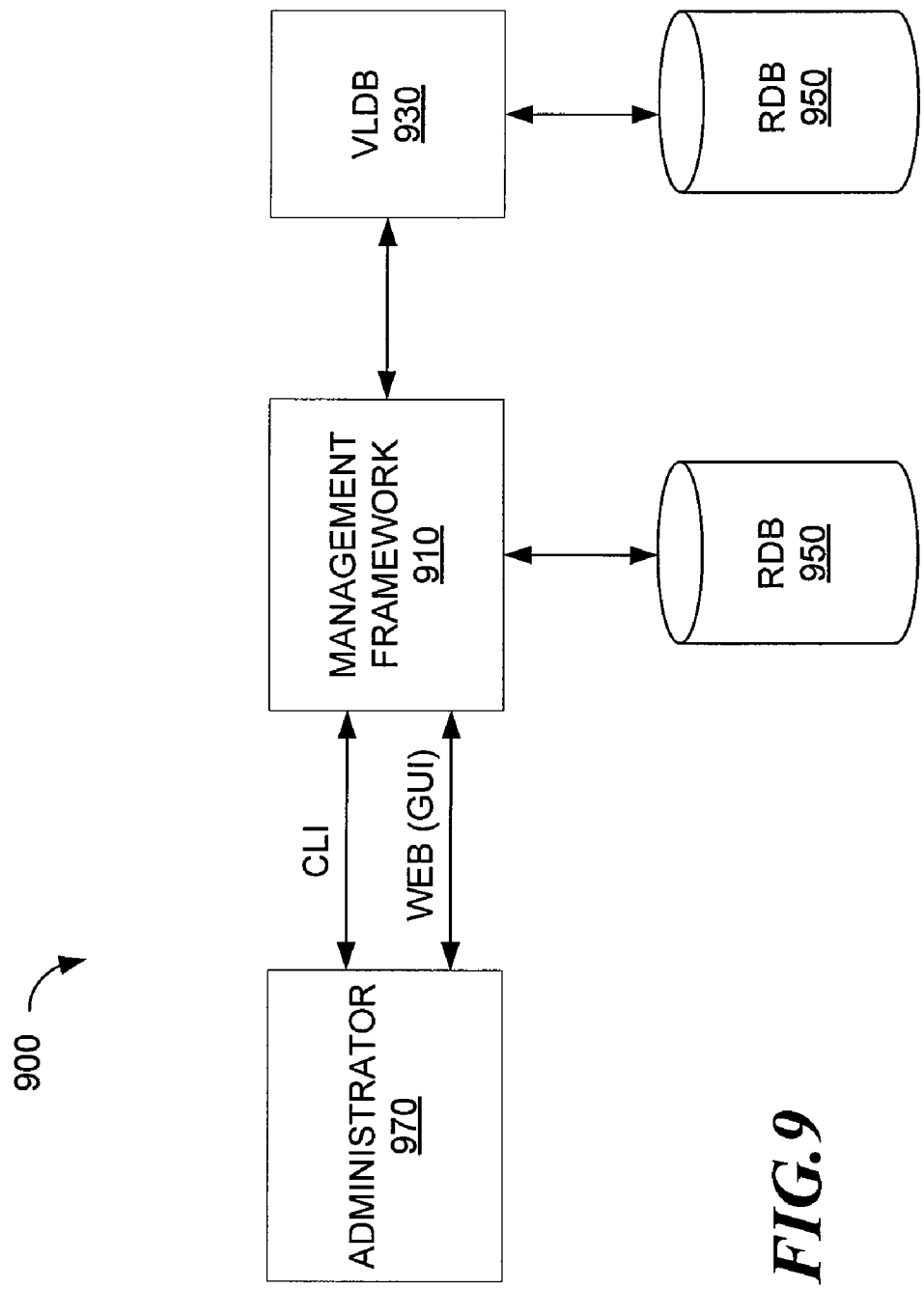
FIG. 9 is a schematic block diagram illustrating a collecting of management processes in accordance with an illustrative embodiment of the present disclosure.

FIG. 9 is a schematic block diagram illustrating a collection of management processes that execute as user mode applications 900 on the storage operating system 300 to provide management of configuration information (i.e. management data) for the nodes of the cluster. The management framework process 910, including provision of anti-virus services, were previously described in view of the M-module 352 in FIG. 3B. Continuing, in view of data replication services, the management framework process 910 and a volume location database (VLDB) process 930, each utilize a data replication service (RDB 950) linked as a library. The management framework 910 provides a user to an administrator 970 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 930 is a database process that tracks the locations of various storage components (e.g., SVSs, flexible volumes, aggregates, etc.) within the cluster 100 to thereby facilitate routing of requests throughout the cluster. In the illustrative embodiment, the N-module 310 of each node accesses a configuration table 235 that maps the SVS ID of a data container handle to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 810") and aggregates 800 within the cluster. The VLDB illustratively implements a RPC interface, e.g., a Sun RPC interface, which allows the N-module 310 to query the VLDB 930. When encountering contents of a data container handle that are not stored in its configuration table, the N-module sends an RPC to the VLDB process. In response, the VLDB 930 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 900 on the M-Module 335.

To that end, the management processes have interfaces to (are closely coupled to) RDB 950. The RDB 950 comprises a library that provides a persistent object store (storing of objects) for the management data processed by the management processes. Notably, the RDB 950 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

FIG. 10 is a schematic block diagram illustrating a method 1000 for scanning data for viruses in accordance with an illustrative embodiment of the present disclosure. Illustrated on the right are operations performed on the client 180 and illustrated on the left are operations performed by the N, D, and M modules 310, 350, 352 executing in a clustered storage system including a cluster 100 of node[s] 200 that communicate over a communication fabric. It will be appreciated that the N, D, and M modules 310, 350, 352 may respectively execute on the same node 200, different nodes 200, or any combination thereof. Further, it will be appreciated that, within a node 200, the N, D, and M modules 310, 350, 352 may respectively execute on the same processor 222A, different processors 222A, B, C, or any combination thereof. The method 1000 commences at the client 180 that communicates a request for data to a node 200 in the cluster 100. Specifically, the request may be to access a file (e.g., read, write, update, etc.) that stores data, the file being stored on a storage device (e.g., disk array 120).

At operation 1004, at the cluster 100, the N-module 310 receives the request and the anti-virus filter module 336 identifies whether the requested file requires scanning. Specifically, the anti-virus filter module 336 may communicate over the CF with the M-module 352 to retrieve the appropriate on-access policy that is utilized to determine whether the requested file requires scanning for viruses. Merely for example, the anti-virus filter module 336 may receive the request for data and identify a virtual server based on the location of the data. Next, the anti-virus filter module 336 may identify the appropriate on-access policy by matching the virtual server associated with the request for data with the virtual servers respectively associated with the on-access policy. The anti-virus filter module 336 utilizes matching virtual servers to identify the appropriate on-access policy. Next, the anti-virus filter module 336 may execute the business rules in the on-access policy to generate a scan flag with a status that indicates whether the file requires scanning or does not require scanning, generate parameters that may be used to optimize scanning services, and identify a file optimization profile that includes commands that may be executed to further process the request for data. Finally, the anti-virus filter module 336 communicates the results (e.g., scan flag, the parameters, and the request for data) in the form of second result information to the D-module 350.

The parameters may, for example, include a priority that enables the anti-virus scanning services to generate a sequence or a queue that includes a plurality of requests ordered according to the priority. Accordingly, the priority parameter provides the advantage of expediting critical requests. Further, the parameters may include a flag that indicates a type of request for data. Specifically, the flag may indicate a "file read" or a "file write." The flag may signal to the D-module and the M-module 352 to block a response until the scanning operation is complete (e.g., read request). Specifically, a client 180 that requests a write to a file is not required to wait for the scanning to be completed because the clustered storage system may asynchronously scan the file for viruses independent of the client 180 request. Accordingly, asynchronous virus scanning, as provided by the cluster 100, provides the advantage of reducing the latency in responding to the client 180.

At operation 1006, at the D-module 350, the anti-virus on-access module 351 identifies whether the file requires scanning based on anti-virus attributes 710 stored with the file. Specifically, the anti-virus on-access module 351 identifies the file requires scanning based on the scan flag received from the N-module 310. Next, the anti-virus on-access module 351 may identify that the file requires scanning based on the scan status 712 associated with the file. Merely for example, the anti-virus on-access module 351 may identify the file requires scanning based on a scan status 712 of "UNKNOWN" and, conversely, does not require scanning based on a scan status 712 of "CLEAN" and "INFECTED." In another embodiment, the anti-virus on-access module 351 may further identify whether files associated with the scan status 712 of "CLEAN" and "INFECTED" are associated with an anti-virus version identifier 714 that matches the anti-virus version identifier 714 of the third party software components 919 presently executing in the anti-virus server module 912. Non-matching versions may indicate the antivirus server module 912 has been updated with a more recent version of third-party software components 919. At operation 1008, the anti-virus on-access module 351 communicates the results (e.g., scan flag, parameters and request) in the form second result information to the M-module 352.

At operation 1010, at the M-module 352, the anti-virus server module 912 receives the scan flag, parameters, and the request. Next, the anti-virus server module 912 communicates a request for the file over the CF to the file system on the D-module 350. At operation 1012, the anti-virus server module 912 reads the data from the file and causes the anti-virus scan engine 920 to scan the data. The anti-virus scan engine 920 utilizes the virus definitions 922 to scan the data for viruses and generate a scan status 712 that is communicated to the anti-virus server module 912. At decision operation 1016, the anti-virus server module 912 identifies whether a virus has been found based on the scan status 712 (e.g., "INFECTED"). If a virus has been found, processing continues at operation 1018. Otherwise processing continues at operation 1020.

At operation 1018, the anti-virus server module 912 utilizes the quarantine information to identify whether a repair of the file is attempted and the type of repair attempted, as previously described. At operation 1020, the anti-virus server module 912 generates anti-virus attributes 710 for the file. Specifically, the anti-virus server module 912 generates anti-virus attributes 710 by utilizing the scan status 712 received from the anti-virus scan engine 920 and the anti-virus version identifier 714 associated with the anti-virus scan engine 920 and the virus definitions 922 used to scan the file for viruses. At operation 1022, the anti-virus server module 912 communicates a command(s) to the D-module 350 to update the generated anti-virus attributes 710 on the storage device (e.g., cache/disk array 120).

At operation 1024, at the D-module 350, the file system 360 receives the request and updates the anti-virus attributes 710 on the storage device (e.g., cache/disk array 120) corresponding to the scanned file.

At operation 1026, at the M-module 352, the anti-virus server module 912 communicates the scan status 712 to the D-module 350. At operation 1028, at the D-module 350, the anti-virus on-access module 351 receives the scan status 712 and at operation 1030 the anti-virus on-access module 351 communicates the data and or the scan status 712 to the N-module 310. At operation 1032, at the N-module 310, the anti-virus filter module 336 receives the data and/or the scan status 712 and communicates the data or a message to the client 180.

At operation 1036, at the client 180, the data is received or a message indicating access denied is displayed and the process ends.

FIG. 11 is a schematic block diagram illustrating a method 1100 for updating third party software components 919 in accordance with an illustrative embodiment of the present disclosure. Illustrated on the right are operations performed on the vendor repository 354 and illustrated on the left are operations performed by the D, and M modules 350, 352 executing in a clustered storage system including a cluster 100 of node[s] 200 that communicate over a communication fabric. It will be appreciated that the D and M modules 350, 352 may respectively execute on the same node 200, different nodes 200, or any combination thereof. Further, it will be appreciated that, within a node 200, the D and M modules 350, 352 may respectively execute on the same processor 222A, different processors 222A, B, C, or any combination thereof.

The method 1100 commences at the M-module 352 with the anti-virus update module 916 communicating a request for third party software components 919 to the vendor repository 354. In one embodiment, the anti-virus update module 916 may communicate the request responsive to receiving a command from an administrator 970 who operates the management station 195. In another embodiment, the anti-virus update module 916 may communicate the request responsive to a schedule timeout. It will be appreciated that the anti-virus update module 916 is not limited to any single vendor repository 354 and may request third party software components 919 from any one of a plurality of vendor repositories 354.

At operation 1120, the vendor repository 354 receives the request and, at operation 1122, the vendor repository 354 communicates third party software components 919 based on the request. Specifically, the vendor repository 354 may communicate an anti-virus scan engine 920, the virus definitions 922 and an anti-virus version identifier 714 that uniquely identifies the engine 920 and definitions. In one embodiment, the request received at the vendor repository 354 may specify communication of the most recent version of third party software components 919. In another embodiment, the request received at the vendor repository 354 may specify a specific version of third party software components 919.

At operation 1124, at the M-module 352, the anti-virus update module 916 receives the third party software components 919 and, at operation 1126, the anti-virus update module 916 updates the third party software components 919 in the anti-virus server module 912. Specifically, the update effectively installs the third party software components 919 such that the anti-virus server module 912 may execute the third party software components 919 to scan data for viruses. At operation 1128, the anti-virus update module 916 communicates the third party software components 919 to the D-module 350. At operation 1130, at the D-module 350, the file system 360 stores the third party software components 919 on the local storage 230.

The foregoing description has been directed to particular embodiments of the disclosure. It will be apparent, however, that other variations and modifications may be made to the described embodiments with the attainment of some or all of their advantages. Specifically, it should be noted that the principles of the disclosure may be implemented in a non-distributed file system. Furthermore, while this description has been written in terms of D, N, and M-modules, the teachings of the present disclosure are equally suitable to systems in which the functionality of the N, D and M-modules are implemented in a single system. Alternatively, the functions of the N, D and M-modules may be distributed among a number of separate systems, wherein in each system performs one or more functions. Additionally, the features of the present disclosure have been described with respect to a cluster, containing two nodes, however, it is equally applicable to clusters including a plurality of nodes, which allow for an n-way failover. Additionally, the procedures, processes and/or modules described herein may be implemented in hardware, software, embodied as a computer readable medium having program instructions, for one or a combination thereof. Therefore, it is the object of the appended claims to cover all such variations and modifications as come within the true spirit and scope of the disclosure.

What is claimed is:

1. A method for scanning data for viruses, the method comprising:

receiving a request for the data at a network N-module included in a clustered storage system, the clustered storage system including nodes that are interconnected as a cluster to communicate over a communication fabric to facilitate storage of the data on the clustered storage system;
identifying at the network N-module the data requires scanning for viruses based on a predetermined criterion;
communicating the data requires the scanning for viruses based on the predetermined criterion as first result information to a disk D-module included in the clustered storage system;
identifying at the disk D-module the data requires scanning for viruses based on a first plurality of anti-virus attributes stored with the data;
communicating the data requires scanning for viruses based on the first plurality of anti-virus attributes stored with the data as second result information to a management M-module included in the clustered storage system; and
scanning at the management M-module the data for viruses, the scanning performed with third party software components that are provided by a third party vendor.

2. The method of claim 1, wherein the receiving the request for the data includes receiving a request, over a network, to access a file that includes the data.

3. The method of claim 2, wherein the identifying whether the data requires the scanning for viruses includes identifying whether the file requires scanning for viruses based on a business rule that includes the predetermined criterion.

4. The method of claim 2, wherein the receiving the request to access the file includes receiving a request in any one of a group of network protocols including a common internet file system (CIFS) protocol and a network file system protocol (NFS).

5. The method of claim 4, wherein the nodes includes a first node and a second node and further including the first node receiving the request in any one of the network protocols and communicating the request in a second protocol to the second node.

6. The method of claim 5, wherein the scanning the data for the viruses is performed on the second node.

7. The method of claim 1, further including generating a second plurality of antivirus attributes based on the scanning the data for viruses, wherein the second plurality of antivirus attributes include a scan status and a version identifier that identifies a version of the third party software components.

8. The method of claim 1, further including receiving an updated version of third party software components from a third party vendor, the third party software components are used for the scanning the data for viruses.

9. The method of claim 8, wherein the updated version of third party software components include an anti-virus scan engine and antivirus definitions that are associated with a version identifier.

10. A clustered storage system for scanning data for viruses, the clustered storage system comprising:
at least one processor, the clustered storage system including nodes that are interconnected as a cluster to communicate over a communication fabric to facilitate storage of the data in the clustered storage system; and
a memory in communication with the at least one processor, the memory comprising a plurality of instructions executable by the at least one processor, wherein the plurality of instructions are executed by the at least one processor, the clustered storage system is configured to:
receive a request for the data at a network N-module included in the clustered storage system,
identify at the network N-module the data requires a scan for viruses based on a predetermined criteria,
communicate the data requires the scan for viruses based on the predetermined criteria as first result information to a disk D-module included in the clustered storage system, identify at the disk D-module the data requires a scan for viruses based on a first plurality of anti-virus attributes stored with the file,
communicate the data requires the scan for viruses based on the first plurality of anti-virus attributes stored with the file as second result information to a management M-module included in the clustered storage system, and
scan at the management M-module the data for the viruses, the scan performed with third party software components that are provided by a third party vendor.

11. The clustered storage system of claim 10, wherein the at least one processor is being configured to receive a request that includes a demand to scan a file for viruses, the file to include the data.

12. The clustered storage system of claim 11, wherein the predetermined criteria includes a business rule that includes a file extension criterion that matches a file extension appended to the file.

13. The clustered storage system of claim 11, wherein the request for data includes a request to access a file and wherein the request is received in a network file system protocol (NFS) and wherein the at least one processor is further being configured to identify whether the data requires scanning for viruses based on a permission level associated with the file.

14. The clustered storage system of claim 13, wherein the nodes includes a first node and a second node and wherein the first node is to receive the request in any one of the network protocols and to communicate the request to the second node in a second protocol.

15. The clustered storage system of claim 14, wherein the first node includes a first anti-virus scan engine that is received at the clustered storage system from a first vendor repository and the second node includes a second anti-virus scan engine that is received at the clustered storage system from the first vendor repository.

16. The clustered storage system of claim 11, wherein the at least one processor is further being configured to identify whether the file requires the scan for viruses based on a business rule that identifies whether the data is persistently stored in a predetermined location on a storage device.

17. The clustered storage system of claim 10, wherein the at least one processor is further being configured to:
generate a scan status based on the scanning the data; and
persistently store the scan status and an anti-virus version identifier, wherein the anti-virus version identifier identifies the third party software components that are used by the at least one processor to generate the scan status.

18. The clustered storage system of claim 10, wherein the nodes include a first and second node and the at least one processor is further being configured to:
update an anti-virus scan engine and virus definitions on the first and second nodes to enable the first and second nodes to scan the data for viruses, wherein the anti-virus scan engine and the virus definitions are retrieved from a first vendor repository operated by a first vendor.

19. A clustered storage system for scanning data for viruses, the system comprising:
at least one processor, the clustered storage system including nodes that are interconnected as a cluster to communicate over a communication fabric to facilitate storage of the data in the clustered storage system; and a machine readable medium in communication with the at least one processor, the machine readable medium being configured to store a plurality of instructions executable by the at least one processor to cause the clustered storage system to:

receive a request for the data at a network N-module included in the clustered storage system, identify at the network N-module the data requires a scan for viruses based on a predetermined criteria, communicate the data requires the scan for viruses based on the predetermined criteria as first result information to a disk D-module included in the clustered storage system, identify at the disk D-module the data requires a scan for viruses based on a first plurality of anti-virus attributes stored with the file, communicate the data requires the scan for viruses based on the first plurality of anti-virus attributes stored with the file as second result information to a management M-module included in the clustered storage system, and scan at the management M-module the data for the viruses, the scan performed with third party software components that are provided by a third party vendor.

20. The clustered storage system of claim 19, wherein the nodes include a first node and a second node and wherein the at least one processor is further being configured to retrieve a file that contains the data from a storage device that is coupled to the first node and quarantine the file to a storage device that is coupled to the second node.

* * * * *